Feb. 5, 1946. L. C. ROTTER ET AL 2,394,487
VALVE
Original Filed Oct. 5, 1942
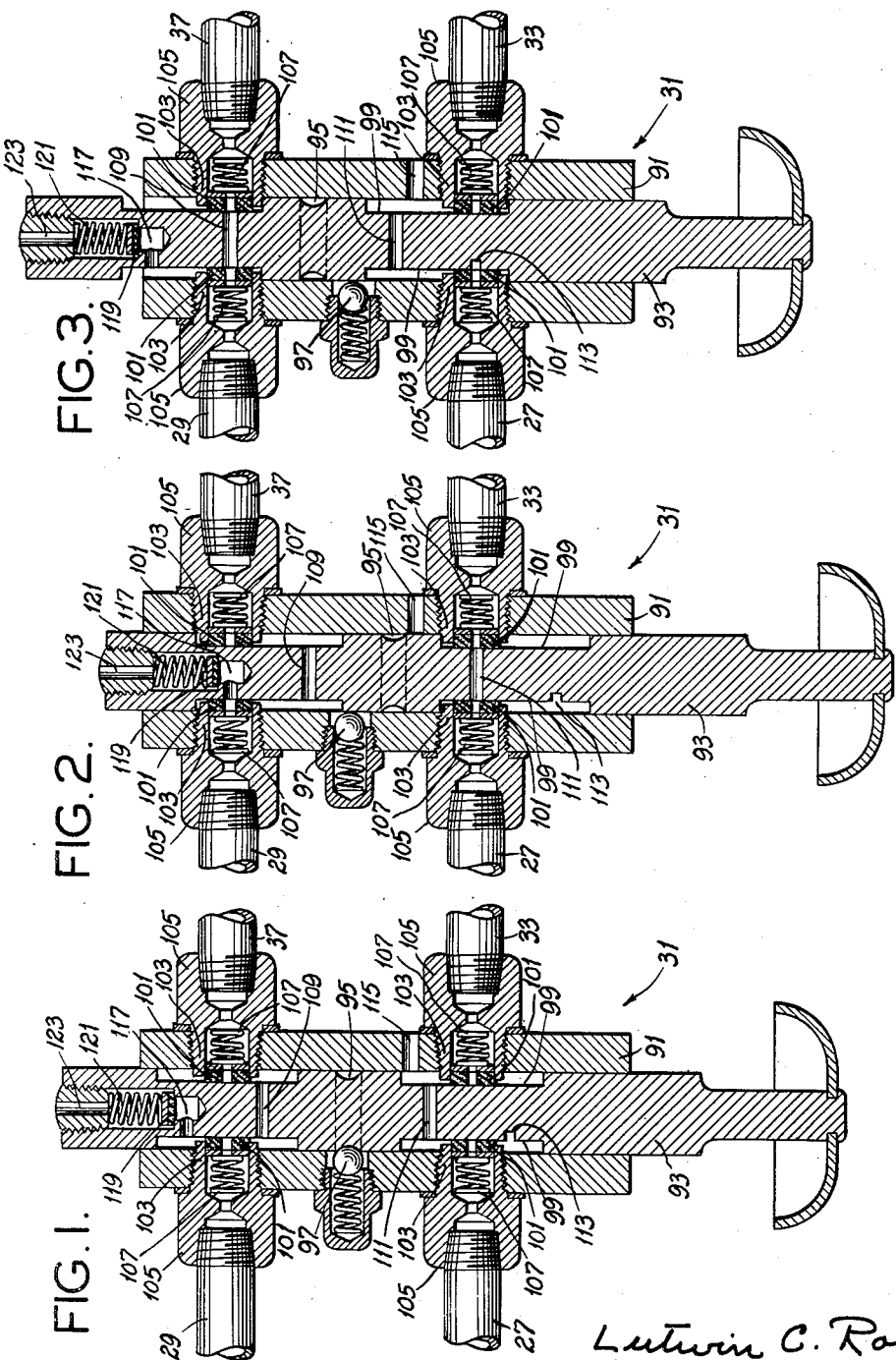
Lutwin C. Rotter,
Victor G. Klein,
Inventors.
Haynes and Koenig,
Attorneys.

Patented Feb. 5, 1946

2,394,487

UNITED STATES PATENT OFFICE 2,394,487

VALVE

Lutwin C. Rotter, Maplewood, and Victor G. Klein, St. Louis, Mo., assignors to Lincoln Engineering Company, St. Louis, Mo., a corporation of Missouri Original application October 5, 1942, Serial No. 460,790. Divided and this application August 5, 1944, Serial No. 548,256

3 Claims. (Cl. 277—46)

This invention relates to valves, and with regard to certain more specific features, to valves for use with apparatus such as shown in our United States patent application Serial No. 460,-790, filed October 5, 1942, for Pump. The present invention is a division of the invention specified in said application.

Among the several objects of the invention may be noted the provision of a double-ported valve with means for alternately opening each of said ports and exhausting through the other; the provision of a valve of the class described adapted to throttle one of the exhaust ports so as to limit to a predetermined amount pressure that will be exhausted thereby; the provision of a valve of the class described in which said pressure limitation is confined to one port; and the provision of a valve of this class which is simple in construction and foolproof in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a vertical section of a control valve embodying the invention and shown in mid position;

Fig. 2 is a view similar to Fig. 1, showing the valve in a position to effect a throttle exhaust and to build up back pressure; and, Fig. 3 is a view similar to Fig. 1, but showing said valve in another position.

Similar reference characters indicate corresponding parts throughout the several views of the drawings.

As illustrated in the parent application, it is sometimes desirable, by means of a single valve, alternately to admit air to opposite sides of an operating piston while at the same time exhausting air from the side to which air is admitted. The present valve supplies means for maintaining an exhaust back pressure on one side of the piston which is different from the exhaust back pressure on the other side.

Referring now more particularly to the drawing, the valve is shown generally by numeral 91. It consists in a body portion 91 bored out to receive a slide valve 93, the latter being grooved as shown at 95 for detent cooperation with a spring-biased ball 97. When the ball 97 is in the groove as indicated at Fig. 1, the valve is in mid position.

The stem 93 is cylindric except where flat as indicated at 99 for cooperation with sealing washers 101 in cups 103 forming parts of nipples 105. Springs 107 in the cups 105 normally bias the washers 101 into sealing engagement with the flats 99 respectively. The lengths of the flats 99 are such as to permit desired movement of the valve on both sides of mid position.

Stem 93 is ported as indicated at 109 and 111, so that when the stem is in mid position (Fig. 1) neither port transmits air. When the stem 93 is down, (Fig. 2) the port 111 admits air between pipes 33 and 27.

When the stem 93 is up (Fig. 3), the port 109 connects pipes 37 and 29. Also, when one set of pipes 33, 27 or 37, 29 is connected the other is disconnected from the air pressure supply.

In addition, when the stem 93 is up (Fig. 3), the pipe 27 may exhaust via a groove 113, port 111 and an exhaust 115. When the valve is down (Fig. 2), the pipe 29 may exhaust through a port 117 and a throttle valve 119 which is held to a seat in the port 117 by a spring 121, reacting from a hollow plug 123. Under these conditions, any exhaust from the pipe 29 must be at a pressure determined by the spring 121.

It will be understood from the above that the pipes 33 and 37 are inlet pipes for delivering air respectively to pipes 27 and 29 and that the latter are connected to opposite sides of the controlled piston (not shown). Therefore, when the valve is in the Fig. 2 position air from pipe 33 passes to pipe 27 and hence to one side of said piston. At that time the air on the other side of the piston is forced out through pipe 29 and the port 117, supply pipe 37 being then cut off. On the other hand, when the valve is in the Fig. 3 position, air flows from the supply pipe 37 to the pipe 29 to the other side of the piston (not shown). At this time the air that was on the opposite side of the piston flows out through pipe 27 and exhaust 115, the supply pipe 33 at this time being cut off. It is of course clear that other mechanisms beside the piston may receive the air supplied by the present valve.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. A valve comprising a body, a movable member cooperating therewith, a detent between the body and the movable member for determining a neutral position from which the movable member may move to two operative positions, said body having two ports to be controlled and spaced apart a certain distance, said movable member having two supply ports more closely spaced than are said body ports and adapted in opposite moved positions of the movable member alternatively to connect with the body ports, said movable member having additional exhaust ports spaced apart more widely than the spacing of said body ports and adapted in said opposite positions of the movable member to connect with said body ports as the supply ports in the movable member alternatively connect therewith, and a throttle relief valve in series with one only of said exhaust ports.

2. A valve comprising a body, a movable member cooperating therewith, a detent between the body and the movable member for determining a neutral position from which the movable member may move to two operative positions, said body having two ports to be controlled and spaced apart a certain distance, said movable member having two supply ports spaced apart a distance less than the distance between the body ports and adapted in alternative moved positions of the movable member alternatively to connect with the body ports, said movable member having additional exhaust ports spaced apart a distance greater than the spacing of the body ports and adapted alternatively to connect with said body ports as the supply ports in the movable member alternatively connect therewith, and a throttle relief valve in series with one only of said exhaust ports, the other exhaust port being substantially free.

3. A valve comprising a body, a movable member cooperating therewith, a detent between the body and the movable member for determining a neutral position from which the movable member may move to two operative positions, said body having two ports to be controlled and spaced apart a certain distance, said movable member having two supply ports spaced apart a distance less than the distance between the body ports and adapted in alternative moved positions of the movable member alternatively to connect with the body ports, said movable member having additional exhaust port portions spaced apart a distance greater than the spacing of the body ports and adapted alternatively to connect with said body ports as the supply ports in the movable member alernatively connect therewith, one of said exhaust port portions being in the movable member only, a throttle relief valve in said last-named exhaust port portion and carried on the movable member exclusively, the other exhaust port portion being in part formed by the movable member and in part by the body.

LUTWIN C. ROTTER.
VICTOR G. KLEIN.